US006662955B1

(12) United States Patent
Lassota

(10) Patent No.: US 6,662,955 B1
(45) Date of Patent: Dec. 16, 2003

(54) BEVERAGE INGREDIENT FILTER AND ASSEMBLY

(75) Inventor: Zbigniew G. Lassota, Long Grove, IL (US)

(73) Assignee: Food Equipment Technologies Company Inc., Lincolnshire, IL (US)

( * ) Notice: Subject to any disclaimer, the term of this patent is extended or adjusted under 35 U.S.C. 154(b) by 0 days.

(21) Appl. No.: 09/205,411

(22) Filed: Dec. 3, 1998

Related U.S. Application Data

(63) Continuation-in-part of application No. 09/131,992, filed on Aug. 11, 1998, now Pat. No. 6,148,717.

(51) Int. Cl.$^7$ .............................................. B01D 39/16
(52) U.S. Cl. ............... 210/482; 210/497.01; 210/497.2; 99/306; 99/323
(58) Field of Search .................... 210/493.1, 493.5, 210/464, 473, 481, 482, 497.01, 497.2, 495, 508, 496; 99/323, 306

(56) References Cited

U.S. PATENT DOCUMENTS

| | | | | |
|---|---|---|---|---|
| 3,780,871 A | * | 12/1973 | Hicks et al. | |
| 4,157,967 A | * | 6/1979 | Meyst et al. | |
| 4,374,026 A | * | 2/1983 | Greutert | |
| 4,765,896 A | * | 8/1988 | Harley et al. | |
| 4,821,630 A | * | 4/1989 | Roberts | |
| 4,929,354 A | * | 5/1990 | Meyering et al. | |
| 4,957,632 A | * | 9/1990 | Bockstiegel et al. | |
| 5,064,533 A | * | 11/1991 | Anson | |
| 5,176,825 A | * | 1/1993 | Hadjis et al. | |
| 5,290,444 A | * | 3/1994 | Campbell | |
| 5,298,267 A | * | 3/1994 | Gruenbacher | |
| 5,567,461 A | * | 10/1996 | Lehrer | |
| 5,605,710 A | * | 2/1997 | Pridonoff et al. | |
| 5,842,408 A | * | 12/1998 | Hatta | |
| 5,873,999 A | * | 2/1999 | Gaiser | |

* cited by examiner

*Primary Examiner*—W. L. Walker
*Assistant Examiner*—David Sorkin
(74) *Attorney, Agent, or Firm*—James W. Potthast; Potthast & Associates

(57) ABSTRACT

A beverage ingredient filter (10) having a relatively inwardly located, filtering, inner section (12) of the beverage ingredient filter (10) made of water permeable filter paper (11) and a relatively outwardly located, water impervious and nonfiltering outer section (14) of the beverage ingredient filter continuously joined to and surrounding the inner filtering section (12) of beverage ingredient filter.

4 Claims, 3 Drawing Sheets

BEVERAGE INGREDIENT FILTER AND ASSEMBLY

CROSS REFERENCE TO RELATED APPLICATION

This application is a continuation-in-part of U.S. patent application Ser. No. 09/131,992, now U.S. Pat. No. 6,148,717, inventor on Aug. 11, 1998, and entitled "Beverage Maker With Intermittent Beverage Liquid Dispenser and Apparatus and Method for Uniform Contact of Brew Ingredient with Brew Liquid", which is hereby incorporated by reference.

FIELD OF THE INVENTION

This invention generally relates to beverage brewing apparatus for brewing a freshly brewed beverage and more particularly a beverage ingredient filter assembly and method of making the same.

DESCRIPTION OF THE RELATED ART INCLUDING INFORMATION DISCLOSED UNDER 37 CFR 1.97–1.99

In known beverage ingredient filter assemblies used in commercial brewers, the beverage ingredient is held within a truncated conical filter paper which, in turn, is held within and supported within a filter holder. The filter holder, in turn, is removably mounted within a brew basket mounted for movement between a brew position beneath a beverage dispense opening, and an unloading/loading position spaced from the dispenser opening for removal and insertion of the filter holder.

As described in the parent application of which this is a continuation-in-part application, the shape of the filter holder and the manner in which the hot water is passed through the beverage ingredient within the filter results in uneven saturation of the ingredient. This problem is overcome in part by holding the ingredient in a uniform layer, preferably in a cylindrical shape.

In the case of nondisposable artificial filters made of gold mesh and the like, small particles of the beverage pass through the filter and enter into the beverage. There are some indications that consumption of particulate coffee grounds can contribute to the possibility of a person contracting cancer.

While known beverage ingredient paper filters stop such particle from entering the beverage, the inventor has determined that they fail to provide for a uniform flow of hot water through a uniform level of ingredient. This is due in part to the truncated conical shape of then known filter papers. The inventor has also determined that uniform saturation would not be possible even if the shape were corrected because of uniform filtering capacity throughout the entire paper coffee filter.

SUMMARY OF THE INVENTION

It is therefore the principal objective of the present invention to overcome the disadvantages of the known beverage ingredient filters, filter assemblies and methods of brewing to provide a method of making a filter of the present invention.

It is therefore the principle object of the invention to provide a beverage ingredient filter having a relatively inwardly located, filtering inner section of beverage ingredient filter paper made of water permeable filter paper and a relatively outwardly located, water impervious and non-filtering outer section of beverage ingredient filter paper continuously joined to and surrounding the inner filtering section of beverage ingredient filter paper.

The object is also achieved by provision of a filter holder with a generally flat, generally open bottom and at least one side wall extending from the flat bottom in a general direction perpendicular to the flat bottom, a filter having an inner section and an outer section, with the inner section made of water permeable filter material resting on the flat bottom, and the outer section made of nonfiltering, water impermeable material continuously joined to the inner section and being supported by the at least one side wall in an upright position perpendicular to the flat bottom.

Further, obtainment of the object is achieved by providing a beverage ingredient filter having an inner section of water permeable filter paper, an outer section made of water impermeable material surrounding the inner section and means for attaching the inner section continuously to the outer section.

The object is also achieved in part by providing a method of making a beverage ingredient filter, including the steps of forming from water permeable paper filter stock a piece of filter sized paper having an inner section surrounded by an outer section and treating the outer portion to render the outer portion water impermeable.

Still another object is achieved by providing a method of making a beverage ingredient filter, including the steps of joining an inner section of water permeable material to an outer section made of water impermeable material surrounding the inner section and folding the outer section to form a generally cylindrical shape with the inner section defining a round bottom.

In accordance with the beverage brewing method of the present invention a beverage ingredient is brewed by placing the ingredient into a disposable, flexible, composite filter having an inner, filtering, bottom section and an outer nonfiltering water impervious wall section joined to and extending in a direction that is generally perpendicular to the filtering bottom section, removably mounting the disposable, flexible filter within a filter holder having a porous bottom to enable the passage of beverage, and a side extending from the bottom and in a direction that is generally perpendicular to the porous bottom, passing hot water onto the ingredient while located within the filter when the filter is being supportively held within the filter holder to brew the ingredient to make the brewed beverage, and dispensing the beverage through the inner, filtering, bottom section.

Preferably, after the brewing cycle is completed the filter with the ingredient is removed from the holder after the brewing is completed and are disposed of together. In the case of the side of the filter holder being porous, passage of brewed beverage through the porous side of the filter holder is prevented by the nonporous side of the filter. The ingredient is arranged in a uniform layer across the bottom section of the filter before the start of the brew cycle to facilitate uniform saturation of all the ingredient.

BRIEF DESCRIPTION OF THE DRAWINGS

The forgoing objects and advantages features of the invention will be explained in greater detail and others will become more apparent from detailed description of the preferred embodiment of the present invention which is given with reference to the several figures of the drawing, in which.

DETAILED DESCRIPTION

Figure 1A:
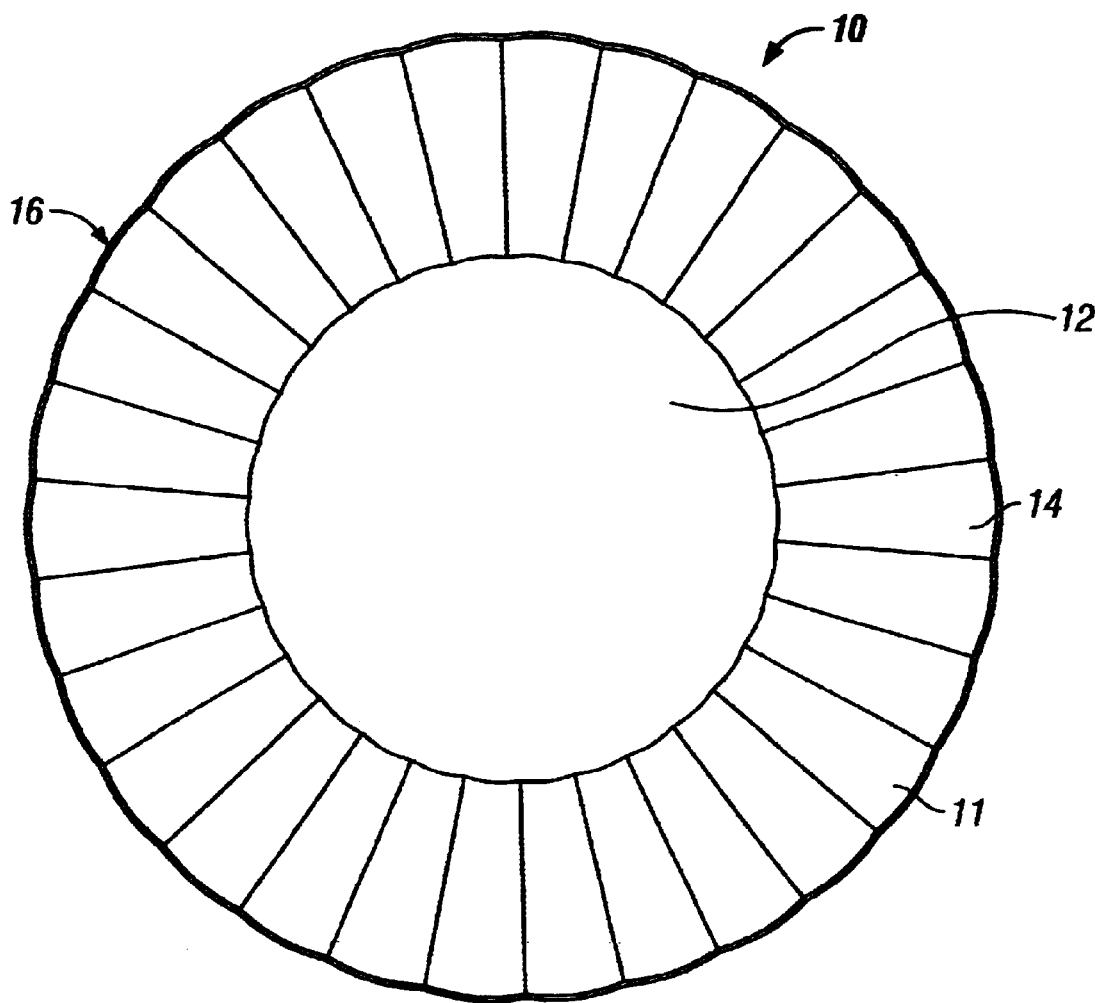
FIG. 1A is a plan view of the beverage ingredient filter of the preferred embodiment showing the inner section and the outer section.
Figure 1B:
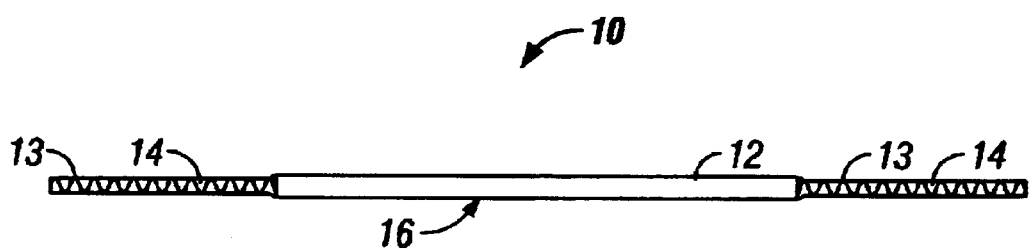
FIG. 1B is a side elevational view of FIG. 1A.

Referring now to FIGS. 1A and 1B, the preferred embodiment the beverage ingredient filter 10 of the present invention has a relatively inwardly located, filtering, inner central, circular section 12 made of water permeable filter paper. A relatively outwardly located, water impervious and nonfiltering outer annular section 14 of the beverage ingredient filter is continuously joined to and surrounds the inner filtering section 12. The inner section 12 is integrally formed with and joined with the outer section 14, both sections 12 and 14 being made from a single piece of filter paper 11. Each of the sections 10 and 12 initially has the same filtering capacity but the outer 14 section is altered to dimensionally reduce, relative to that of the inner section 12, the porous structure 13 of the section 14 until it is substantially water impervious relative to the inner section 12. Preferably, heat from a hot iron, such as a hot iron used to remove wrinkles from clothing, is manually pressed against the section 14 to flatten and fuse the porous structure of the outer section in the dimensionally reduced state relative to the inner section. This fusing holds the outer section 14 in the dimensionally reduced state.

Figure 1C:
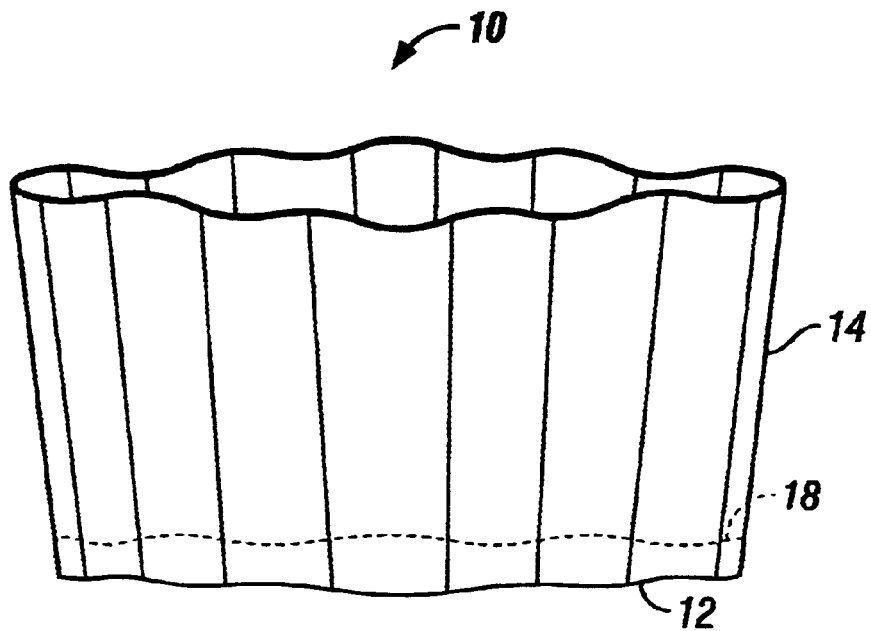
FIG. 1C is a side view of the paper filter of FIG. 1A with the outer section in perpendicular to the inner section.

Referring now to FIG. 1C, after reduction of the porous structure of the outer section 14 the ingredient filter 10, the outer section 14 is bent perpendicular to the inner section 12 to form a generally cup shaped configuration. The outer section 14 forms a generally cylindrical side wall that forms the round section 12 defining the bottom of the cup for holding the ingredient 18 to be brewed.

Figure 2A:
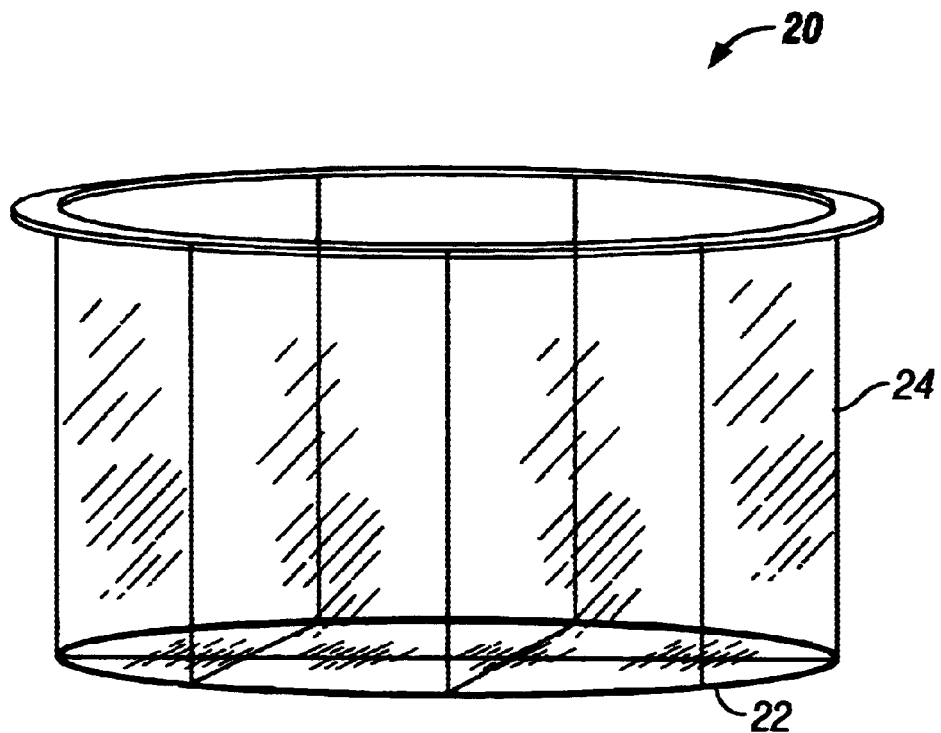
FIG. 2A is a perspective view of the filter basket.
Figure 2B:
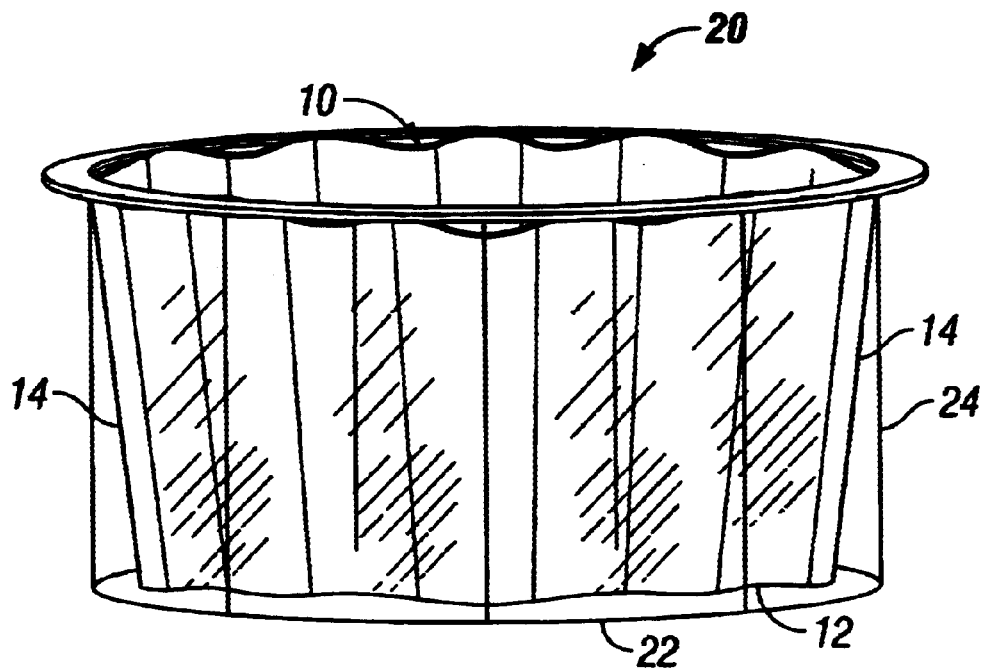
FIG. 2B is a side perspective view showing the beverage ingredient filter within the filter basket.

Referring now to FIG. 2A in accordance with one aspect of the invention showing a filter holder 20 is provided with a generally cylindrical shape. The holder 20 has a generally flat wire mesh open bottom 22 and a cylindrical wire mesh side wall 24 extending from the flat bottom 22 in a direction generally perpendicular to the flat bottom 22. The beverage ingredient filter 10 of FIGS. 1A–1C, is folded to also have a generally cylindrical shape that conforms in size to the filter holder 20. The filter of FIG. 1C is placed within the filter holder, as seen in FIG. 2B, with the inner section 12 of the filter 10 resting on the flat bottom 22 of the holder 20. The cylindrical side section 24 of the filter holder 20 supports the outer section 14 of the beverage ingredient filter 10 in snug conforming cylindrical configuration. The outer section 14 is held in an upright position extending in a direction generally perpendicular to the bottom. The side wall 24 of the filter holder, being composed of wire mesh, is porous. Alternatively the side wall 24 is composed of a nonporous material such as plastic.

Figure 3:
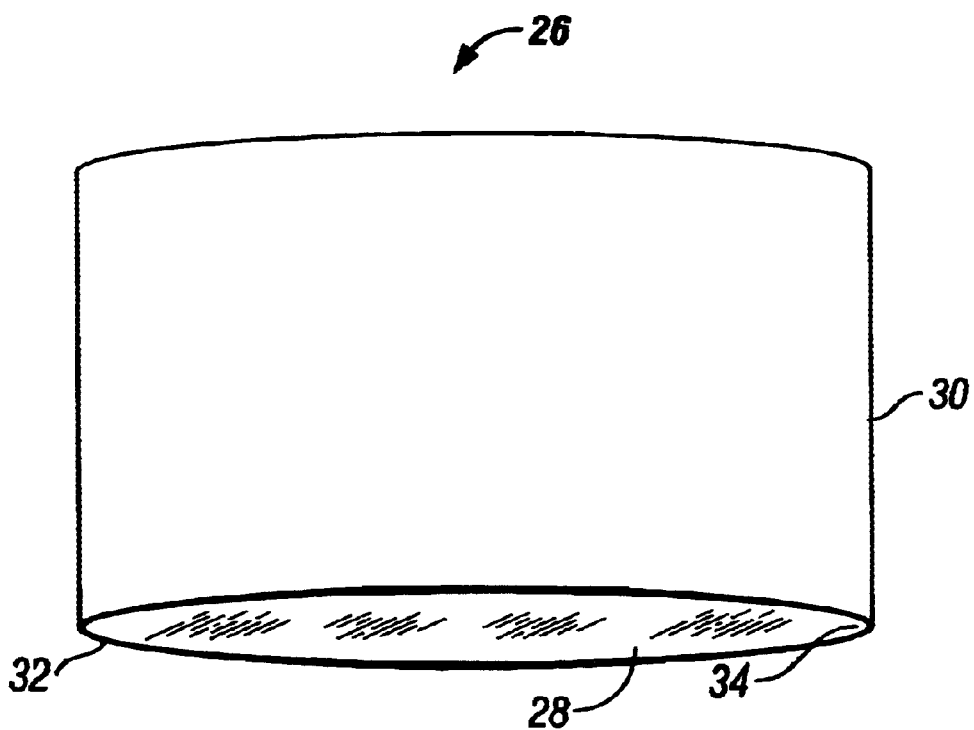
FIG. 3 is a perspective another beverage ingredient filter having an inner section made of water pervious material and an outer section made of water impervious material.

Refering now to FIG. 3, an alternate embodiment of a beverage ingredient filter 26 of the invention, having an inner circular section 28 made water permeable filter paper like that of the filter 10 of FIG. 1. The inner section 28 is joined continuously but is not integrally formed with the outer section 30. The outer section is cylindrical and made of water impermeable material other than altered filter paper. An outer perimeter 32 of the inner section 28 is joined to an inner perimeter 34 of the outer section 30.

The method of making the beverage ingredient filter 10 of FIGS. 1A–1C, includes the steps of forming from water permeable paper stock a piece of filter sized paper 16 having an inner section 12 surrounded by an outer section 14 and treating the outer portion 14 to render the outer portion 14 water impermeable.

The method also includes the step of making both the inner section 12 and the outer section 14 from a single piece of filter paper 16 and altering the outer section 14 to render the outer section 14 impermeable to water. The step of altering includes the steps of dimensionally reducing the porous structure of the outer section relative to the inner section 12 until it is substantially water impervious relative to the inner section 12. Preferably heat is applied with a hot iron, like a clothing iron, to fuse together the porous structure in a reduced state relative to the inner section 12. Alternatively, the initial paper from which the filter 20 is made is nonfiltering paper and the central section 12 is treated mechanically or chemically to render it porous.

The method of making a beverage ingredient filter 26 of FIG. 3, includes the steps joining an inner section 28 of water permeable filter material to an outer section 34 made of water impermeable material surrounding the inner section 28 and folding the outer section 30 to form a cup with a generally cylindrical shape and a round bottom defining the inner section.

In accordance with the beverage brewing method of the present invention the ingredient is placed into the disposable, flexible, composite filter 10 having an inner, filtering, bottom section 12 and an outer nonfiltering water impervious wall section 14 joined to and extending in a direction that is generally perpendicular to the filtering bottom section 12. The disposable, flexible filter 10 is releasably mounted within a filter holder 20 having a porous bottom 22 to enable the passage of beverage, and a side 24 extending from the bottom 22 and in a direction that is generally perpendicular to the porous bottom 22. Then hot water is passed onto the ingredient while located within the filter 10 when the filter is being supportively held within the filter holder 20 to brew the ingredient and thereby make the brewed beverage. The beverage is dispensed through the inner, filtering, bottom section 12.

After the brew cycle has been completed the filter 12 with the ingredient is removed from the holder 20 after the brewing is completed and both the spent ingredient, such as wet coffee grounds and the filter are disposed of together.

In the case of the side of the filter holder 20 being porous, passage of brewed beverage through the porous side of the filter holder 20 is prevented by the nonporous side 14 of the filter 10.

Before the brew cycle commences the ingredient is arranged in a uniform layer across the bottom section of the filter to facilitate uniform saturation of the ingredient during the brew cycle.

While a preferred embodiment of the present invention has been disclosed in detail, it should be appreciated that many variations may be made with respect to the details of the preferred embodiment without departing from the scope of the invention as defined in the appended claims.

What is claimed is:

1. A single sheet beverage ingredient filter, comprising:
   a relatively inwardly located, filtering, inner, bottom section of beverage ingredient filter paper made solely and entirely of a single sheet of water permeable filter paper for support of beverage ingredient resting on the bottom to allow a flow of beverage uniformly and continuously across the entire bottom; and a relatively outwardly located, water impermeable and nonfiltering outer side wall section of beverage ingredient filter paper integrally formed with and continuously and contiguously joined to and surrounding the inner, bottom filtering section of beverage ingredient filter paper and extending upwardly from the bottom to define a water impervious side wall surrounding an open top through which ingredient may be dumped directly onto the bottom section for directing water through substantially the full thickness of any ingredient being supported by the bottom and through all and substantially only the filtering bottom section;

said inner bottom section and outer side wall section being integrally formed from a single sheet of ingredient filter paper but in which the bottom section filter paper has a porous structure that is water permeable and the outer side wall section has a structure like that of the bottom section hut which has been fattened and dimensionally reduced relative to the porous structure of the bottom section to reduce the porosity of the outer section to render the outer section substantially water impervious relative to the inner section.

2. The single sheet beverage ingredient filter of claim 13 in which the structure of the outer side wall section has portions that are fused together to hold them in a dimensionally reduced flattened state relative to the inner section.

3. The single sheet beverage ingredient filter of claim 1 in which the inner bottom section is round and the outer side section is annular in shape.

4. A beverage ingredient filter assembly, comprising:

a cylindrical, rigid, reusable filter holder with a generally flat, round, porous bottom and cylindrical, porous side wall extending from the flat bottom to an open top in a general direction perpendicular to the flat bottom; and a flexible single sheet filter having an inner bottom section and an outer wall section, said inner bottom section being entirely made of water permeable filter material resting on the flat bottom of the filter holder to enable uniform and continuous flow of beverage across the entire bottom section of the filter, said outer wall section entirely made of nonfiltering, water impermeable material continuously and contiguously joined to and surrounding the inner bottom section and extending upwardly from the bottom section to an open top and being laterally supported in a cylindrical configuration conforming to that of the cylindrical side wall of the holder in an upright position perpendicular to the flat bottom.

\* \* \* \* \*